(12) United States Patent
Kim et al.

(10) Patent No.: US 12,213,190 B2
(45) Date of Patent: Jan. 28, 2025

(54) QoS-RELATED OPERATION METHOD IN WIRELESS COMMUNICATION SYSTEM AND APPARATUS THEREFOR

(71) Applicant: LG ELECTRONICS INC., Seoul (KR)

(72) Inventors: Laeyoung Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 407 days.

(21) Appl. No.: 17/608,853

(22) PCT Filed: May 7, 2020

(86) PCT No.: PCT/KR2020/006023
§ 371 (c)(1),
(2) Date: Nov. 4, 2021

(87) PCT Pub. No.: WO2020/226435
PCT Pub. Date: Nov. 12, 2020

(65) Prior Publication Data
US 2022/0312509 A1 Sep. 29, 2022

(30) Foreign Application Priority Data

May 7, 2019 (KR) .................. 10-2019-0053306

(51) Int. Cl.
*H04W 76/10* (2018.01)
*H04W 28/02* (2009.01)
*H04W 80/10* (2009.01)

(52) U.S. Cl.
CPC ....... *H04W 76/10* (2018.02); *H04W 28/0268* (2013.01); *H04W 80/10* (2013.01)

(58) Field of Classification Search
CPC . H04W 28/0268; H04W 76/10; H04W 80/10; H04W 28/02; H04W 76/12; H04W 76/22
See application file for complete search history.

(56) References Cited

U.S. PATENT DOCUMENTS 11,184,916 B2 * 11/2021 Chen .................. H04W 72/20
11,323,386 B2 * 5/2022 Dannebro ........... H04L 47/2441
(Continued)

OTHER PUBLICATIONS

Huawei, Qualcomm Incorporated, HiSilicon, "Discussion on SA2 LS on QoS support for eV2X over Uu interface", 3GPP TSG-RAN WG2 Meeting #105bis, Apr. 8-12, 2019, R2-1904867.

(Continued)

*Primary Examiner* — Liton Miah
(74) *Attorney, Agent, or Firm* — BRYAN CAVE LEIGHTON PAISNER LLP

(57) ABSTRACT

An embodiment provides a method comprising the steps of: receiving, by an NG-RAN, a PDU session-related message including a Qos profile and two or more alternative QoS profiles, which relate to a QoS flow; determining whether the QoS profile can satisfy the QoS flow; transmitting, to an SMF, a first notification indicating that the QoS profile does not satisfy the QoS flow; determining whether the two or more alternative QoS profiles can satisfy the QoS flow; and transmitting, to the SMF, a second notification indicating that the alternative QoS profiles satisfy the QoS flow, wherein the second notification includes information about an alternative Qos profile capable of satisfying the QoS flow, among the two or more alternative QoS profiles.

12 Claims, 19 Drawing Sheets

(56) References Cited

U.S. PATENT DOCUMENTS

| | | | |
|---|---|---|---|
| 11,832,123 B2* | 11/2023 | Gangakhedkar | H04L 47/2475 |
| 11,997,513 B2* | 5/2024 | Velev | H04L 43/0852 |
| 2016/0338027 A1 | 11/2016 | Sun | |
| 2018/0176834 A1* | 6/2018 | Wei | H04W 36/0066 |
| 2018/0199398 A1* | 7/2018 | Dao | H04W 76/34 |
| 2019/0230556 A1* | 7/2019 | Lee | H04W 28/16 |
| 2019/0268963 A1* | 8/2019 | Kim | H04W 48/18 |
| 2019/0306251 A1* | 10/2019 | Talebi Fard | H04W 76/10 |
| 2020/0229198 A1* | 7/2020 | Kung | H04W 72/54 |
| 2022/0053364 A1* | 2/2022 | Kim | H04W 28/24 |
| 2022/0053449 A1* | 2/2022 | Shan | H04W 36/0066 |

OTHER PUBLICATIONS

Vivo, "Update on Functional Entities description", SA WG2 Meeting #132, Apr. 8-12, 2019, S2-1903481.

"3rd Generation Partnership Project; Technical Specification Group Services and System Aspects; System Architecture for the 5G System; Stage 2 (Release 16)", 3GPP TS 23.501 V16.0.2 (Apr. 2019).

"3rd Generation Partnership Project; Technical Specification Group Services and System Aspects; Procedures for the 5G System; Stage 2 (Release 16)", 3GPP TS 23.502 V16.0.2 (Apr. 2019).

* cited by examiner

QoS-RELATED OPERATION METHOD IN WIRELESS COMMUNICATION SYSTEM AND APPARATUS THEREFOR

This application is the National Stage filing under 35 U.S.C. 371 of International Application No. PCT/KR2020/006023 filed on May 7, 2020, which claims priority to Korean Patent Application Nos. 10-2019-0053306 filed on May 7, 2019, the contents of which are all hereby incorporated by reference herein in their entirety.

TECHNICAL FIELD

The present disclosure relates to a wireless communication system, and more particularly, to a method and apparatus for an NG-RAN to determine and notify whether Alternative QoS Profiles are guaranteed (or fulfilled) even after notifying that a QoS profile was not guaranteed (or fulfilled).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Wireless communication systems adopt various radio access technologies (RATs) such as long term evolution (LTE), LTE-advanced (LTE-A), and wireless fidelity (WiFi). $5^{th}$ generation (5G) is one of them. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, and media and entertainment applications in the cloud or augmented reality (AR). Data is one of the key drivers for 5G and in the 5G era, we may see no dedicated voice service for the first time. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in greater detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

DISCLOSURE

Technical Task

Disclosed in an embodiment are a method and apparatus for an NG-RAN to determine and notify whether Alternative QoS Profiles are guaranteed (or fulfilled) even after notifying that a QoS profile was not guaranteed (or fulfilled).

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solutions

In one technical aspect of the present disclosure, provided is a method of operating a Next Generation-Radio Access Network (NG-RAN) in a wireless communication system, the method including receiving a PDU session related message including a QoS profile related to a QoS flow and two or more Alternative QoS Profiles by the NG-RAN, determining whether to guarantee the QoS profile for the QoS flow by the NG-RAN, transmitting a first notification indicating that the QoS profile is not guaranteed for the QoS flow to an SMF by the NG-RAN, determining whether the two or more Alternative QoS Profiles can be guaranteed for the QoS flow by the NG-RAN, and transmitting a second notification indicating that the Alternative QoS Profile is guaranteed for the QoS flow, wherein the second notification may include information on the Alternative QoS Profile capable of guaranteeing the QoS flow among the two or more Alternative QoS Profiles.

In another technical aspect of the present disclosure, provided is an apparatus in a wireless communication system, the apparatus including at least one processor and at least one computer memory operatively connected to the at least one processor and storing instructions enabling the at least one processor to perform operations when executed, the operations including receiving a PDU session related message including a QoS profile related to a QoS flow and two or more Alternative QoS Profiles by a Next Generation-Radio Access Network (NG-RAN), determining whether to guarantee the QoS profile for the QoS flow by the NG-RAN, transmitting a first notification indicating that the QoS profile is not guaranteed for the QoS flow to an SMF by the NG-RAN, determining whether the two or more Alternative QoS Profiles can be guaranteed for the QoS flow by the NG-RAN, and transmitting a second notification indicating that the Alternative QoS Profile is guaranteed for the QoS flow, wherein the second notification may include information on the Alternative QoS Profile capable of guaranteeing the QoS flow among the two or more Alternative QoS Profiles.

The PDU session related message may be a PDU session modification related message forwarded from the SMF.

The PDU session related message may be a PDU session establishment related message forwarded from the SMF.

The determining whether the two or more Alternative QoS Profiles can be guaranteed for the QoS flow may be performed after the first notification.

The two or more Alternative QoS Profiles may differ from each other in a required QoS.

A level of the required QoS of each of the two or more Alternative QoS Profiles may be lower than that of the QoS profile.

Advantageous Effects

According to the present disclosure, a QoS at a level as high as possible can be quickly provided for a QoS Flow.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure. In the drawings.

BEST MODE FOR DISCLOSURE

Figure 1:
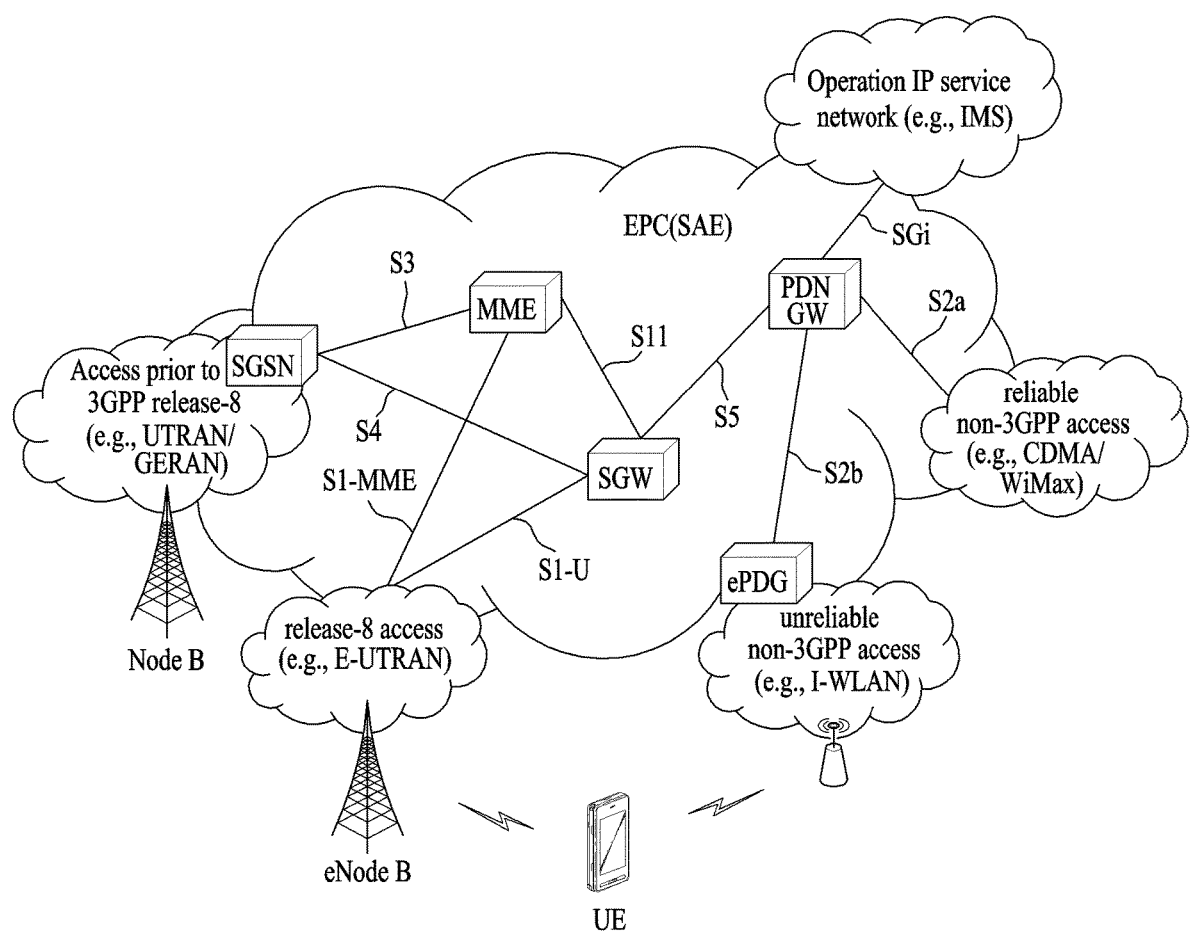
FIG. 1 is a schematic diagram illustrating the structure of an evolved packet system (EPS) including an evolved packet core (EPC).

The embodiments below are combinations of components and features of the present disclosure in a prescribed form. Each component or feature may be considered as selective unless explicitly mentioned as otherwise. Each component or feature may be executed in a form that is not combined with other components and features. Further, some components and/or features may be combined to configure an embodiment of the present disclosure. The order of operations described in the embodiments of the present disclosure may be changed. Some components or features of an embodiment may be included in another embodiment or may be substituted with a corresponding component or feature of the present disclosure.

Specific terms used in the description below are provided to help an understanding of the present disclosure, and the use of such specific terms may be changed to another form within the scope of the technical concept of the present disclosure.

In some cases, in order to avoid obscurity of the concept of the present disclosure, a known structure and apparatus may be omitted, or a block diagram centering on core functions of each structure or apparatus may be used. Moreover, the same reference numerals are used for the same components throughout the present specification.

The embodiments of the present disclosure may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present disclosure in the embodiments of the present disclosure may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present disclosure is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |

TABLE 1-continued

| Reference point | Description |
| --- | --- |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
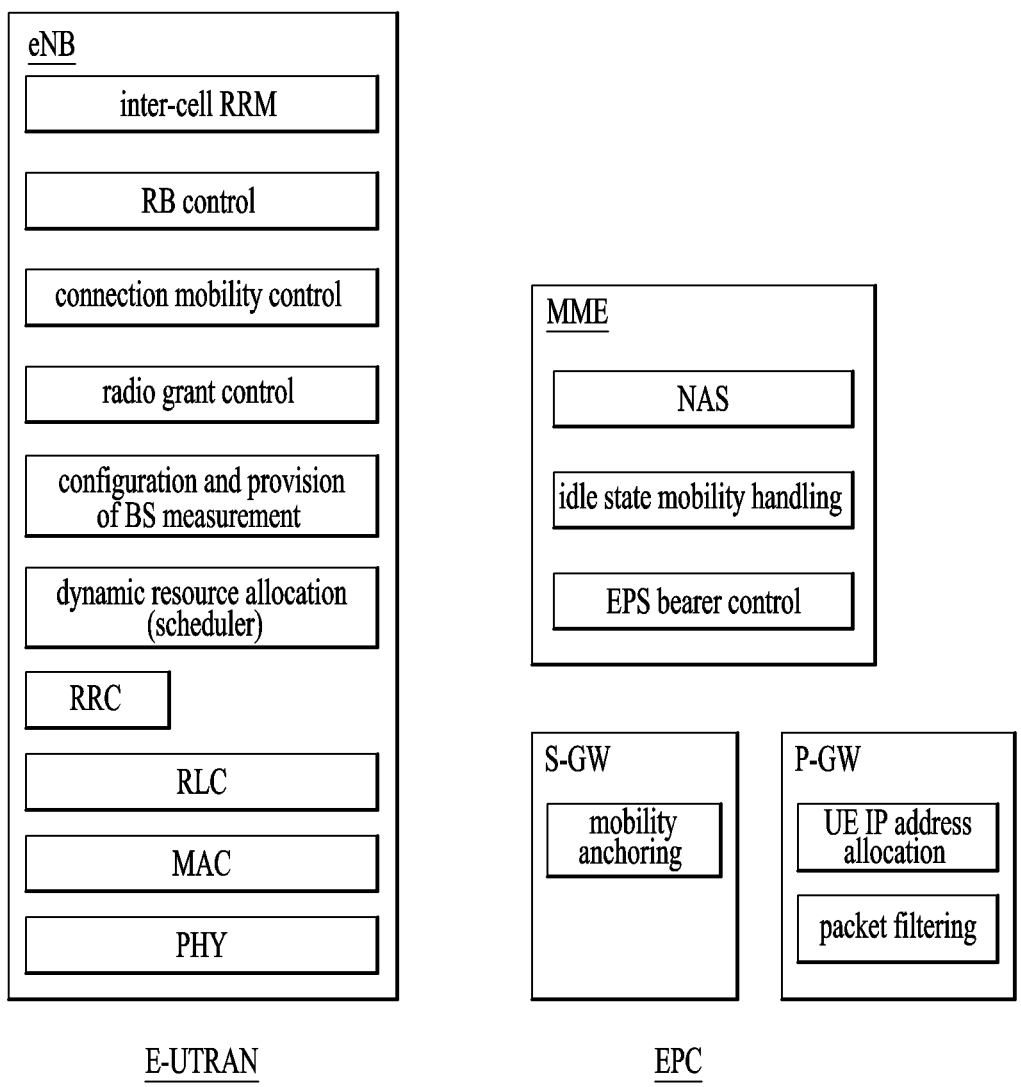
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
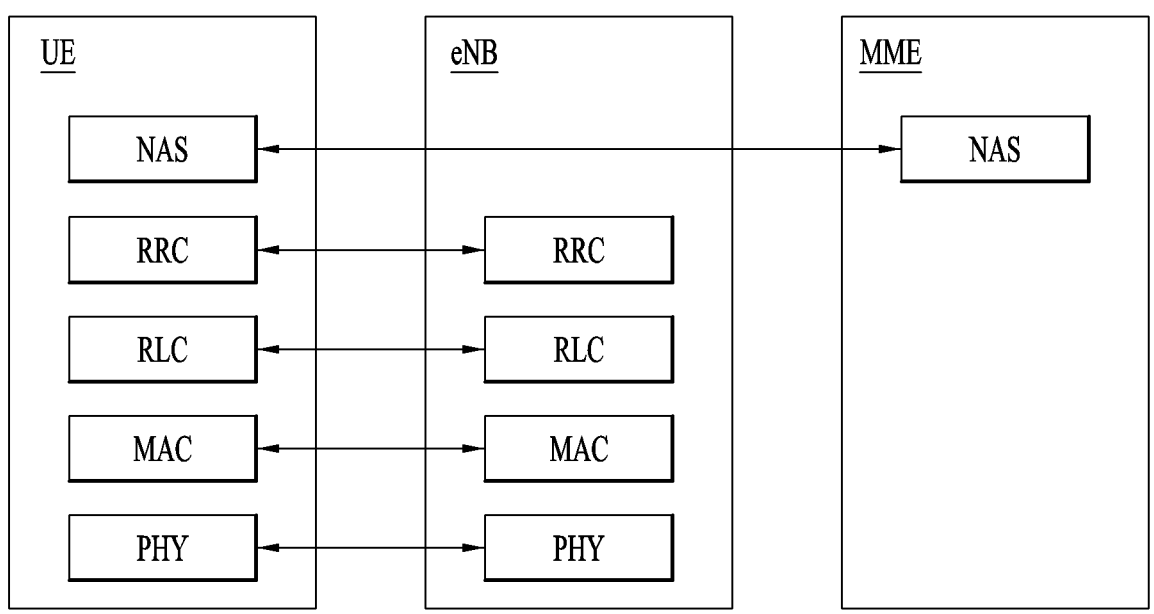
FIG. 3 is a diagram illustrating the structure of a radio interface protocol in a control plane.
Figure 4:
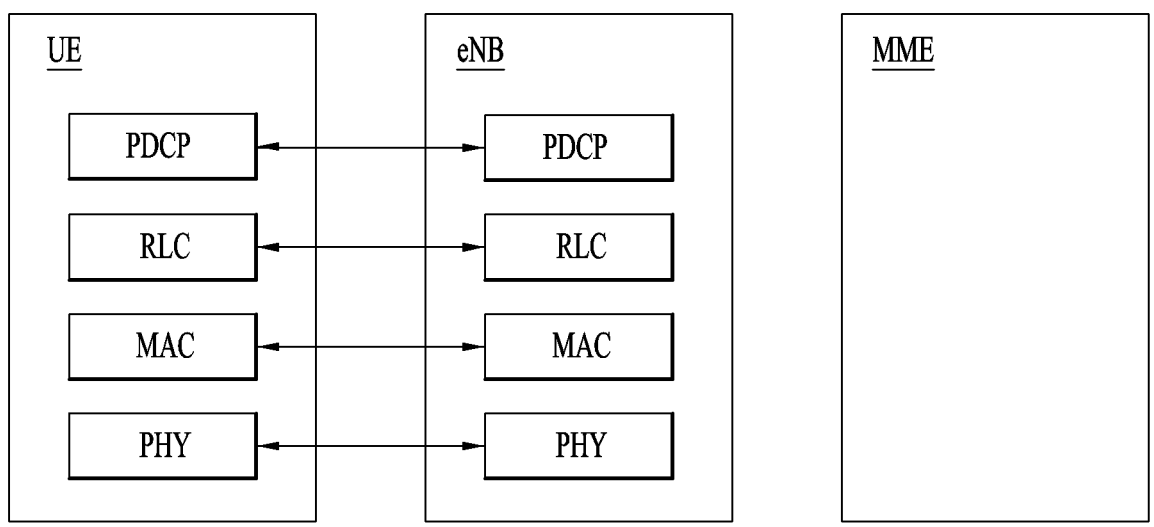
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one identifier (ID). This ID is called an EPS bearer ID. One EPS bearer has QoS characteristics of a maximum bit rate (MBR) and/or a guaranteed bit rate (GBR).

Figure 5:
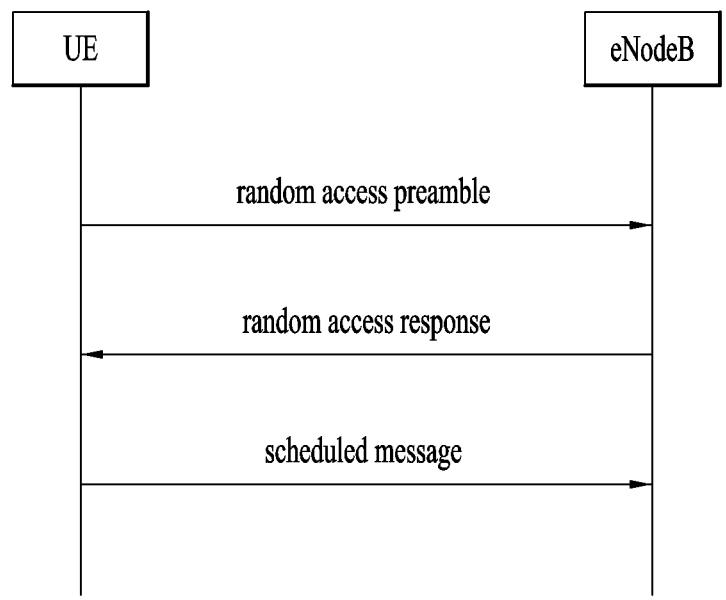
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
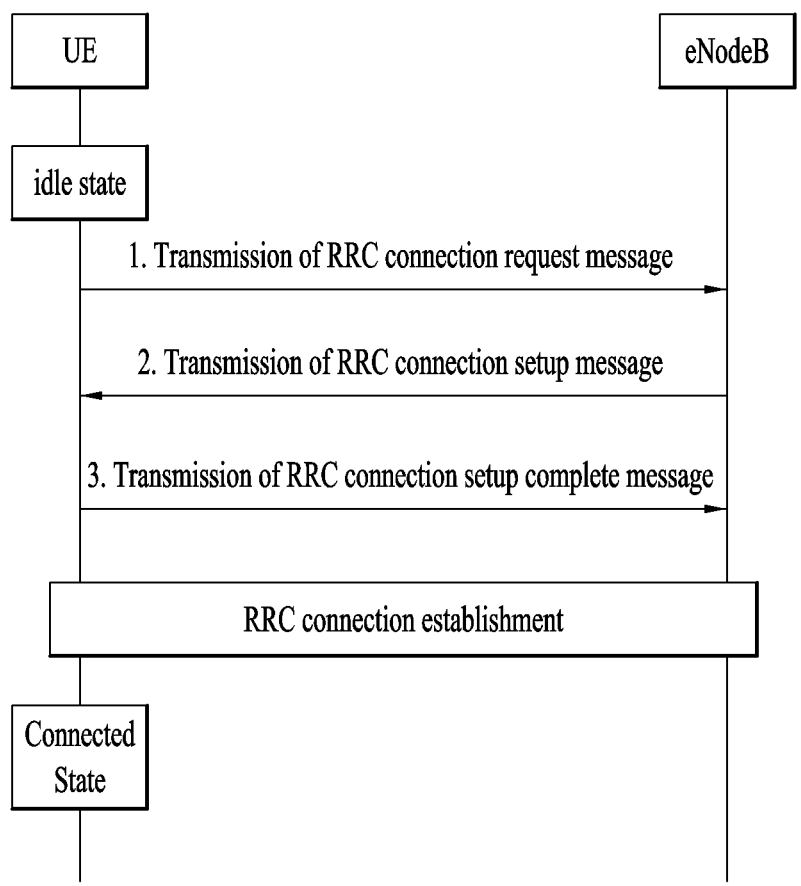
FIG. 6 is a diagram illustrating a connection process in a radio resource control (RRC) layer.

FIG. 6 illustrates a connection procedure in a radio resource control (RRC) layer.

As shown in FIG. 6, the RRC state is configured according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.
2) Upon receiving the RRC connection request message from the UE, the ENB accepts the RRC connection request of the UE when the radio resources are sufficient, and then transmits an RRC connection setup message, which is a response message, to the UE.
3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
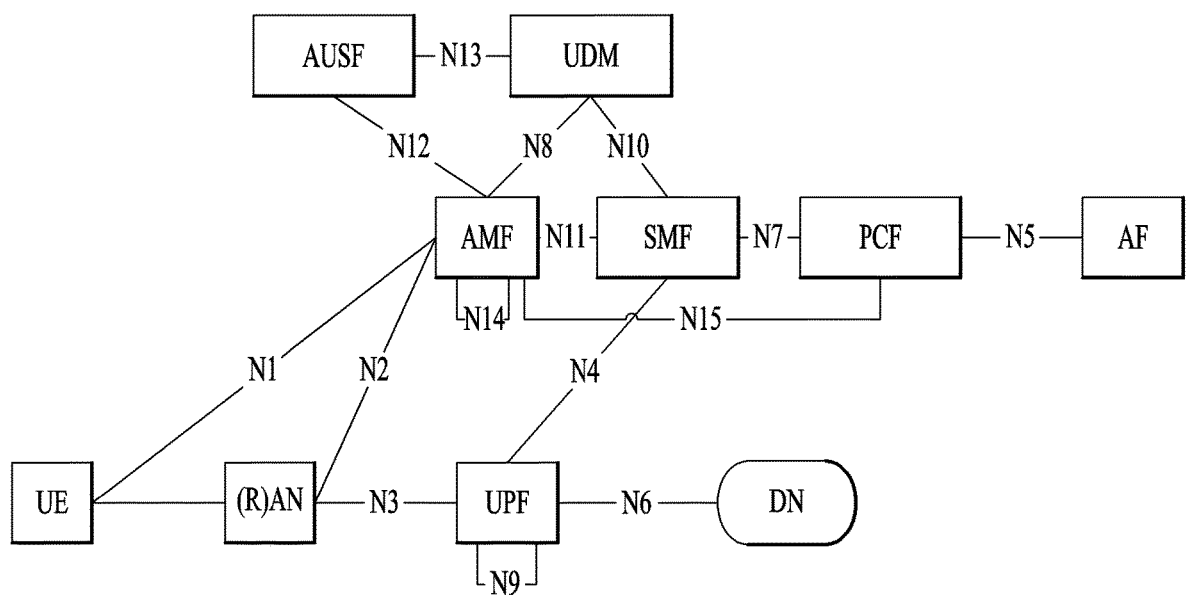
FIG. 7 is a diagram illustrating a 5th generation (5G) system.

The functionality of the MME in the legacy EPC is decomposed into the access and mobility management function (AMF) and the session management function (SMF) in the next generation system (or 5G core network (CN)). The AMF carries out NAS interaction with a UE and mobility management (MM), whereas the SMF carries out session management (SM). The SMF also manages a gateway, user plane function (UPF), which has the user-plane functionality, that is, routes user traffic. It may be considered that the SMF and the UPF implement the control-plane part and user-plane part of the S-GW and the P-GW of the legacy EPC, respectively. To route user traffic, one or more UPFs may exist between a RAN and a data network (DN). That is, for 5G implementation, the legacy EPC may have the configuration illustrated in FIG. 7. In the 5G system, a protocol data unit (PDU) session has been defined as a counterpart to a PDN connection of the legacy EPS. A PDU session refers to association between a UE and a DN, which provides a PDU connectivity service of an Ethernet type or an unstructured type as well as an IP type. The unified data management (UDM) performs the same functionality as the HSS of the EPC, and the policy control function (PCF) performs the same functionality as the policy and charging rules function (PCRF) of the EPC. Obviously, the functionalities may be extended to satisfy the requirements of the 5G system. For details of the architecture, functions, and interfaces of a 5G system, TS 23.501 is conformed to.

The 5G system is being worked on in TS 23.501 and TS 23.502. Accordingly, the technical specifications are conformed to for the 5G system in the present disclosure. Further, TS 38.300 is conformed to for details of NG-RAN-related architecture and contents. As the 5G system also supports non-3GPP access, section 4.2.8 of TS 23.501 describes architecture and network elements for supporting non-3GPP access, and section 4.12 of TS 23.502 describes procedures for supporting non-3GPP access. A representative example of non-3GPP access is WLAN access, which may include both a trusted WLAN and an untrusted WLAN. The AMF of the 5G system performs registration management (RM) and connection management (CM) for non-3GPP access as well as 3GPP access. As such, the same AMF serves a UE for 3GPP access and non-3GPP access belonging to the same PLMN, so that one network function may integrally and efficiently support authentication, mobility management, and session management for UEs registered through two different accesses.

In 5G system, the following QoS parameter and related mechanism, i.e., notification control (or QoS Notification Control: QNC) is defined for the QoS management of Uu communication are defined. The following is an excerpt from TS 23.501v16.0.2, and more details refer to the corresponding document, which is used as the related art of the specification.

QoS parameter notification control indicates whether notification is requested from an NG-RAN when GFBR cannot be further (or again) guaranteed for a QoS flow during a lifetime of the QoS flow. In case that an application traffic can adapt to the change of QoS (e.g., in case that an Application Function (AF) can trigger rate adaptation), notification control may be used for a GBR QoS flow.

An SMF should enable the notification control only if a QoS notification parameter is configured in the PCC rules (received from a PCF) bound to a QoS flow. The notification control parameter is signaled to the NG-RAN as a part of a QoS profile.

Unless a specific condition of the NG-RAN requests a release of an NG-RAN resource (e.g., due to a radio link failure or RAN internal congestion), notification control is activated for a given GBR QoS flow. If the NG-RAN determines that it is unable to guarantee GFBR, the NG-RAN should send a notification to the SMF and maintain the QoS flow (e.g., while the requested GFBR for this GBR QoS flow is not provided). The NG-RAN should attempt to guarantee the GFBR again.

The NG-RAN may determine that it is unable to further guarantee the GFBR (e.g., measurement of queuing delay or system load).

If receiving the notification indicating that the GFBR cannot be further guaranteed from the NG-RAN, the SMF may forward the notification to the PCF (see TS 23.503). A 5G Core (5GC) may initiate N2 signaling to modify or remove the QoS flow.

Once the NG-RAN determines that the GFBR can be guaranteed again for this QoS flow (for which the notification indicating that the GFBR cannot be further guaranteed was sent), the NG-RAN sends a notification, which indicates that the GFBR can be guaranteed again, to the SMF. The SMF may forward this notification to the PCF (see TS 23.503). The NG-RAN should send a follow-up notification indicating that it is unable to further guarantee the GFBR each time it is necessary.

Table 2 relates to the contents of a QoS profile extracted from TS 23.501v16.0.2. Particularly, notification control (i.e., QNC) may be requested to the NG-RAN for GBR QoS Flow.

TABLE 2

5.7.1.2 QoS Profile

A QoS Flow may either be 'GBR' or 'Non-GBR' depending on its QoS profile. The QoS profile of a QoS Flow is sent to the (R)AN and it contains QoS parameters as described below (details of QoS parameters are described in clause 5.7.2):
For each QoS Flow, the QoS profile shall include the QoS parameters:
5G QoS Identifier (5QI); and
Allocation and Retention Priority (ARP).
For each Non-GBR QoS Flow only, the QoS profile may also include the QoS parameter:
Reflective QoS Attribute (RQA).
For each GBR QoS Flow only, the QoS profile shall also include the QoS parameters:
Guaranteed Flow Bit Rate (GFBR) - UL and DL; and
Maximum Flow Bit Rate (MFBR) - UL and DL; and
In the case of a GBR QoS Flow only, the QoS profile may also include one or more of the QoS parameters:
Notification control;
Maximum Packet Loss Rate - UL and DL.
NOTE: In this Release of the specification, the Maximum Packet Loss Rate (UL, DL) is only provided for a GBR QoS flow belonging to voice media.
Each QoS profile has one corresponding QoS Flow identifier (QFI) which is not included in the QoS profile itself.
The usage of a dynamically assigned 5QI for a QoS Flow requires in addition the signalling of the complete 5G QoS characteristics (described in clause 5.7.3) as part of the QoS profile.
When a standardized or pre-configured 5QI is used for a QoS Flow, some of the 5G QoS characteristics may be signalled as part of the QoS profile (as described in clause 5.7.3).

The above QNC mechanism may be extended for a V2X service as follows. Table 3 and Table 4 relate to the contents extracted from TR 23.786v16.0.0, and more details refer to the corresponding document, which is used as the related art of the specification.

TABLE 3

6.27 Solution #27: Solution for QoS Support for eV2X over Uu Interface
6.27.1 Functional Description This solution addresses Key Issue #3 (QoS Support for eV2X over Uu interface) and it reuses the 5GS QoS model specified in TS 23.501 [7] and TS 23.503 [10] with necessary enhancement as follows.
1. An eV2X Application Function (AF) influences the QoS of the eV2X service, by providing service info to the PCF (via NEF if 3rd party AF) as specified in TS 23.503 [10] (and TS 23.203 [12]).
   In addition, when supported by the AF and PCF/NEF, the AF may indicate multiple Alternative Service Requirement(s) in addition to the Requested Service Requirement in the service info.
   The Alternative Service Requirement(s) is of the same format as the Requested Service Requirement that an AF normally requests, e.g. instead of providing one set of bandwidth requirements, the AF provides additionally set(s) of bandwidth requirements, marked as the Alternative Service Requirement(s) in the request.
   In addition, the AF may indicate that the PCF is responsible for changes in the QoS profile of the QoS Flow from the Requested Service Requirement to one of the Alternative Service Requirement(s).
NOTE 1: The AF can indicate that the PCF is responsible for changes in the QoS profile only if the changes do not affect the required bitrate. This ensures that the change in the bitrate requirements is always triggered by the AF and it can therefore always be aligned with rate adaptation of the data flow.
2. PCF authorize the service info from the AF, translates it into PCC rule with QoS parameters such as 5QI, ARP, GBR/MBR, and optionally PL(Priority Level) and notification control and then sends the PCC rule to the SMF.
   If notification control is enabled, the PCF may include Alternative QoS parameter set(s) in the PCC rule sent to the SMF. The PCF derives the Alternative QoS parameter set(s) based on the Alternative Service Requirement(s) provided by the AF.
   The Alternative QoS parameter set(s) is of the same format as the QoS parameter set included in the existing PCC rules.
3. The SMF performs QoS Flow binding and creates a new QoS Flow if no existing QoS Flow can fulfil the service requirement. The SMF also derives the QoS rules and QoS Flow level parameters to the UE, as well as QoS profile to the NG-RAN.
   If notification control is enabled, the SMF may derive Alternative QoS profile(s) based on the Alternative QoS parameter set(s), and send to the NG-RAN.
   The Alternative QoS profile(s) takes the same format as the QoS Profile, i.e. SMF sends multiple sets of QoS Profiles as defined in TS 23.501 [7] to the NG-RAN, which are marked as "Alternative" except one that serves as the target QoS Profile.
4. The NG-RAN receives a N2 PDU Session Request for the purpose of QoS flow establishment which contains the QoS profile in N2 SM Information. Per TS 23.501 [7], in the QoS profile,
   The GFBR is recommended as the lowest acceptable service bitrate where the service will survive, and MFBR > GFBR can be provided to the RAN. The bit rates above the GFBR value and up to the MFBR value may be provided with relative priority determined by the Priority level of the QoS Flows.
   The PDB for GBR QoS Flows with GBR resource type shall be interpreted as a maximum delay with a confidence level of 98 percent if the QoS flow is not exceeding the GFBR. The PDB for delay critical GBR resource type may be exceeded for at most PER packets, that is, a packet delayed more than PDB is counted as lost if the transmitted data burst is less than MDBV within the period of PDB and the QoS Flow is not exceeding the GFBR.
   The Packet Error Rate (PER) defines an upper bound for the rate of PDUs (e.g. IP packets) that have been processed by the sender of a link layer protocol but that are not successfully delivered by the corresponding receiver to the upper layer, i.e. the PER defines an upper bound for a rate of non-congestion related packet losses. For GBR QoS Flows with TABLE 3-continued 6.27 Solution #27: Solution for QoS Support for eV2X over Uu Interface
6.27.1 Functional Description Delay critical GBR resource type, a packet which is delayed more than PDB is counted as lost, and included in the PER unless the data burst is exceeding the MDBV within the period of PDB or the QoS Flow is exceeding the GFBR.
If the NG-RAN supports the feature, NG-RAN will also store the Alternative QoS profile(s)
    5. If the NG-RAN cannot fulfil the GFBR requirement, and/or the PDB requirement and/or the PER requirement of the QoS profile, it notifies the 5GC using the procedure as specified in clause 5.7.2.4 of TS 23.501 [7] and then to the AF (i.e. V2X application).
  NOTE 2: A non-GBR Flow may use the bit rate up to the value of the session AMBR which can be very high, and consequently the non-GBR QoS Flow may take unreasonably large amount of resources and starve resource for other flows, therefore it's considered unrealistic to apply Notification Control for the non-GBR QoS Flow unless a bit rate parameter is also introduced for non-GBR Flow which means a major change to the QoS model.
    If the Alternative QoS profile(s) were received, in addition to the notification to the 5GC and ton the V2X application that the QoS targets cannot be fulfilled, the NG-RAN, when supporting the feature, checks if any of the Alternative QoS Profile(s) could be supported. If the NG-RAN can support one of the Alternative QoS Profile(s), the NG-RAN may include its associated index in the notification, so that the 5GC and V2X application can take this information into account.

TABLE 4

If none of the Alternative QoS profile(s) is applicable, the NG-RAN may provide the information about what QoS characteristics cannot be fulfilled, including the current 'QoS requirements that are guaranteed' (GFBR, PDB and/or PER), using the procedure as specified in clause 5.7.2.4 of TS 23.501 [7] and then to the AF if notification is required so that the V2X application can take this information into account and take proper action.
    NG-RAN still tries to fulfil the original QoS target after sending the notification.
    When radio condition changes, and the requirement of GFBR, PDB and PER of the QoS profile can be fulfilled again, the NG-RAN notifies the 5GC using the procedure as specified in clause 5.7.2.4 of TS 23.501 [7] and then to the AF (i.e. V2X application). The V2X Application then takes proper action based on information provided by the 3GPP system and other sources if available.
  NOTE 3: The format for the indication of Alternative QoS Profiles/levels between NG-RAN and PCF, and of the Alternative Service Requirements between PCF and AF can be decided in the normative phase.
  NOTE 4: How the NG-RAN decides that the PDB and/or PER cannot be fulfilled is implementation specific.
  NOTE 5: Whether the notification enhancement applies to V2X application only is up to the operator policy.
    6. If, in step 1, the AF indicated that the PCF is responsible for changes in the QoS profile of the QoS Flow from the Requested Service Requirement to one of the Alternative Service Requirement(s), the PCF triggers a PDU Session Modification as per TS 23.502 [9] clause 4.3.3.2 step 1.d when AN notifies the 5GC that QoS characteristics cannot be fulfilled and if an Alternative QoS Profile exists which fits to the information included in the AN notification (i.e. a switch from the target QoS Profile to an Alternative QoS Profile triggered by PCF is possible).
    6.27.2 Procedures
Existing 5GS QoS model and QoS Notification Control procedures can be reused with the following enhancement:
    (1) That the NG-RAN can also notify the unfulfillment/re-fulfilment of the QoS characteristics of PDB and PER to the 5GC, and then to the Application Function. NG-RAN, when supporting the feature, can also notify 5GC about the currently supported Alternative QoS profile (index)
    6.27.3 Impact on existing entities and interfaces
The following entities are impacted to support Notification Control proposed in this solution.
    NG-RAN notifies the 5GC and, when supporting the feature, provides supported Alternative QoS Profile (index) to 5GC or the current 'QoS requirements that are guaranteed' (GFBR, PDB and/or PER).
    When enabled, PCF supports to derive the Alternative QoS parameter set(s) based on the Alternative Service Requirement(s) provided by the AF and include the Alternative QoS parameter set(s) in the PCC rule sent to the SMF.
    SMF enables notification at NG-RAN, by providing the Alternative QoS Profile(s) additionally so that the NG-RAN may include the currently supported Alternative QoS Profile (index) when sending a notification to 5GC.
    AF shall be able to provide Alternative Service Requirement(s) and receive the supported Alternative Service Requirement from the PCF.
    6.27.4 Topics for further study
    6.27.5 Solution evaluation
Comparing to Solution #16 Option 1 (clause 6.16), the NG-RAN does not enforce a different QoS Profile when a notification is sent to the 5GC. Rather, it still tries to fulfil the original QoS Profile, i.e. following the same behaviour as defined in Rel-15.
    6.27.6 Conclusions
This solution satisfies the Key Issue #3 regarding QoS monitoring, control and notification.

In Solution #27 of TR 23.786, an SMF may provide Alternative QoS Profile(s) while making a request for a specific GBR QoS Flow to an NG-RAN. If the NG-RAN cannot guarantee (fulfill) a QoS on QoS Profile, the NG-RAN informs a 5G Core Network (5GCN) of it. In doing so, the NG-RAN may select an Alternative QoS Profile indicating a currently supportable QoS from the provided Alternative QoS Profile(s) and then provide it (i.e., index information of the corresponding profile) together. Based on this, the 5 GN may perform PDU Session Modification to support with a currently supportable QoS for the corresponding QoS Flow.

When the PDU Session Modification is performed, QNC can be requested for the QoS Flow. In this case, as the QoS Profile provided to the NG-RAN is the currently supportable QoS indicated by the NG-RAN, it is the QoS at a lower level in comparison to a QoS profile originally provided when a QoS Flow is generated/added (QoS Flow generation/addition is possible via PDU Session Establishment or PDU Session Modification). Hence, the NG-RAN applies QNC for a QoS at a level lower than that of a QoS (i.e., QoS information included in a QoS Profile as a QoS requested to the NG-RAN in QoS Flow generation/addition—this will be referred to as an original QoS) supposed to be originally provided for the corresponding QoS Flow, the 5 GN is unable to know whether the NG-RAN can provide an original QoS.

Accordingly, the present disclosure proposes an efficient QoS management method to solve the above problem. In the following description, a QoS may be interpreted as a QoS level or a QoS standard. A better QoS is used interchangeably with a higher QoS. In addition, if an NG-RAN applies a QNC, it may refer to Section 5.7.2.4 (Notification control) of TS 23.501. Basically, an NG-RAN checks whether it can guarantee (or fulfill) a QoS for a QoS Flow. If the NG-RAN cannot guarantee the QoS, the NG-RAN notifies it to a 5GCN. If the QoS can be guaranteed, the NG-RAN may notify it to the 5GCN. The check period or timing may be realistically determined/configured by the NG-RAN.

According to one embodiment, an NG-RAN may receive a PDU session related message including a QoS profile related to a QoS flow and two or more Alternative QoS Profiles and determine whether to guarantee (or fulfill) the QoS profile (i.e., such a QoS indicated by the QoS profile as GFBR, PDB, PER, etc.) for the QoS flow. If the NG-RAN determines that it is unable to guarantee (or fulfill) the QoS profile, it may determine which one of the Alternative QoS Profiles can be guaranteed (or fulfilled).

As a result, the NG-RAN may send a first notification indicating that the QoS profile is not guaranteed (or fulfilled) for the QoS flow to the SMF. When the notification is sent, information on a guaranteed (fulfilled) Alternative QoS Profile (i.e., currently supportable QoS information) may be provided to the SMF.

Thereafter, the NG-RAN may determine whether it can guarantee (or fulfill) the two or more Alternative QoS Profiles (i.e., Such QoS indicated by the Alternative QoS Profiles as GFBR, PDB, PER, etc.) for the QoS flow. This may be regarded as a case that the NG-RAN can support a better/higher QoS after the first notification. As a result of the determination, a second notification indicating that the Alternative QoS Profile is guaranteed (or fulfilled) for the QoS flow may be transmitted to the SMF. Here, the second notification may include information on the Alternative QoS Profile that can guarantee (or fulfill) the QoS flow among the two or more Alternative QoS Profiles.

The determination on whether to guarantee (or fulfill) the two or more Alternative QoS Profiles for the QoS flow is performed after the first notification. Namely, after the NG-RAN has notified the 5GCN that a QoS cannot be guaranteed for any QoS Flow by applying QNC (together with a currently supportable QoS information), if a better QoS can be guaranteed (or fulfilled) among the Alternative QoS Profiles in comparison to the currently supportable QoS, the NG-RAN notifies it to the 5GCN. To this end, it is also able to provide information indicating which one of the Alternative QoS Profiles can be guaranteed (or fulfilled).

The two or more Alternative QoS Profiles may differ from each other in a required QoS. Each of the two or more Alternative QoS Profiles has a required QoS level lower than that of the QoS profile. In particular, for example, the NG-RAN is assumed as provided with Alternative QoS Profiles #1, #2 and #3. In this case, #1 indicates the highest level QoS, #2 indicates a next level QoS, and #3 indicates the lowest level QoS. The NG-RAN sends a notification, which indicates that QoS cannot be guaranteed (or fulfilled) as a result of the QNC application, to the 5GCN. In this case, assume that a currently supportable Alternative QoS Profile is #3. The NG-RAN may inform the 5GCN of it as well. Thereafter, the NG-RAN checks whether QoS can be guaranteed (or fulfilled) for the Alternative QoS Profile #1 and the Alternative QoS Profile #2. If the QoS of the Alternative QoS Profile #2 can be guaranteed (or fulfilled), the NG-RAN sends a notification indicating it to the 5GCN. In the above description, the 5GCN may or may not perform PDU Session Modification by changing a QoS Profile into a currently supportable QoS each time receiving the notification from the NG-RAN.

Namely, after notifying that the QoS cannot be guaranteed (or fulfilled), the NG-RAN may be interpreted as applying QNC for QoS Profile (including QoS Profile and Alternative QoS Profile(s) all) indicating a QoS at a better level in comparison to the currently supportable QoS.

According to the above configuration, after an NG-RAN has been unable to guarantee (or fulfill) an optimal QoS, i.e., an original QoS for a QoS Flow, if a QoS at a higher level (despite not being an original QoS) in comparison to a currently provided QoS can be guaranteed (or fulfilled), the NG-RAN may quickly provide a QoS at a level as high as possible for the QoS Flow by informing a 5GCN of it. In addition, after an NG-RAN has been unable to guarantee (or fulfill) an optimal QoS, i.e., an original QoS for a QoS Flow, even if the NG-RAN is made to service a corresponding QoS Flow at a level lower than it (this may be interpreted as a QoS level providable by the NG-RAN), the NG-RAN may quickly recover to an original QoS for the QoS Flow in a manner that the 5GCN obtains whether the NG-RAN can guaranteed (or fulfill) the original QoS and then provide a service.

The above description is applicable to Solution #27 of TR 23.786 of the related art and is also applicable together with other embodiments described below.

Figure 8:
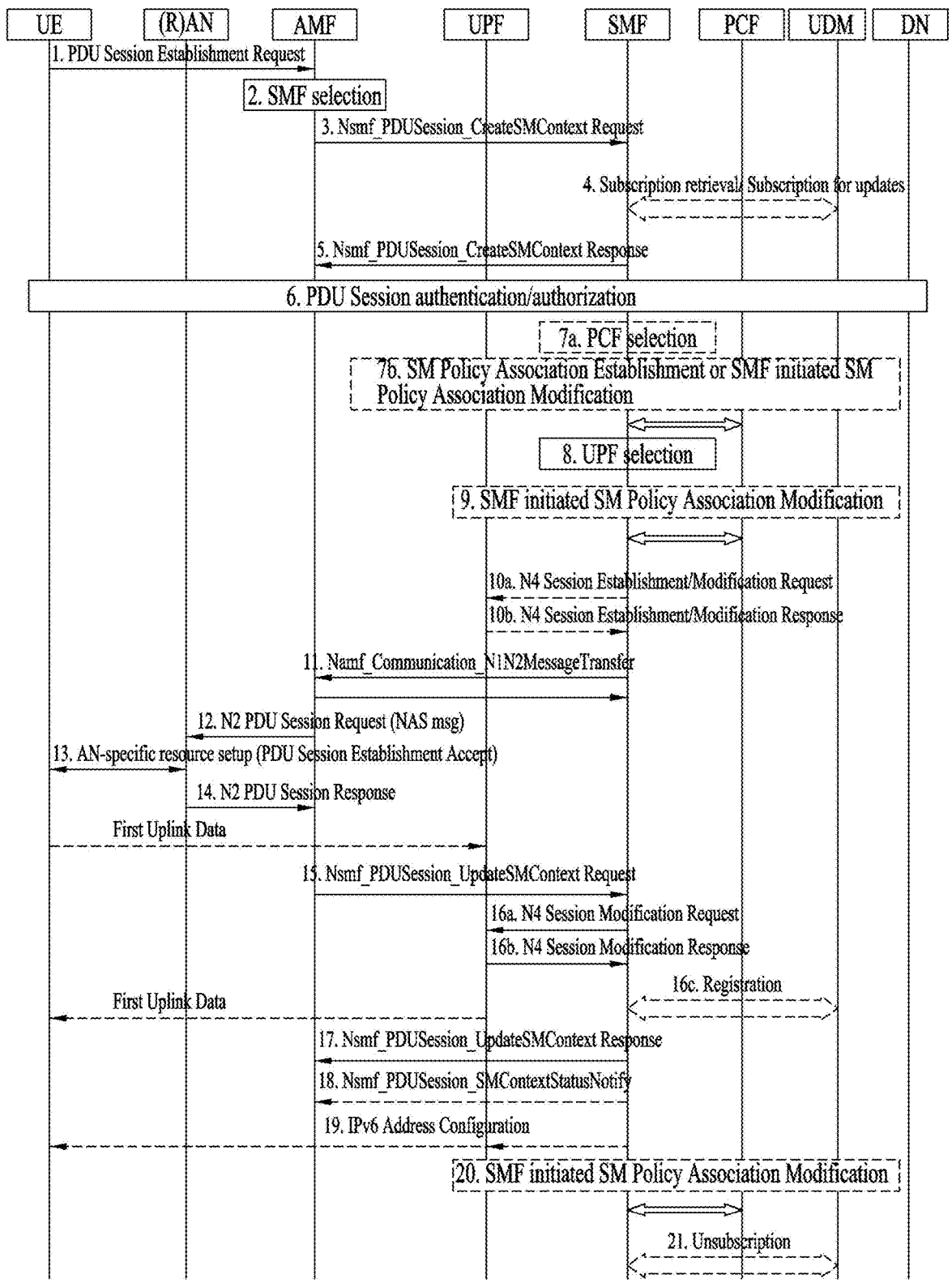
FIG. 8 and FIG. 9 are diagrams to describe embodiment(s) of the present disclosure.

An NG-RAN is provided with an Alternative QoS Profile including the above-described original QoS information from an SMF when the QoS Flow is generated/added. An SMF may provide a QoS Profile and Alternative QoS Profile(s) to the NG-RAN while adding or modifying a QoS Flow. Representatively, a PDU Session Establishment procedure and a PDU Session Modification procedure may be used. Namely, the PDU session related message may be a PDU session establishment related message forwarded from the SMF. FIG. 8 shows a PDU session establishment procedure. Referring to FIG. 8, an SMF may include an Alternative QoS Profile in N2SM information forwarded to an NG-RAN. Namely, one or more Alternative QoS Profiles may be included for a prescribed GBR QoS Flow together with a QoS Profile and then provided to the NG-RAN. An AMF forwards the N2 SM information received from the SMF to the NG-RAN in a step 12. Besides, details of the respective steps shown in FIG. 8 refer to the contents disclosed in 'UE Requested PDU Session Establishment' of Section TS 23.502 4.3.2.2, which is used as the related art of the specification.

Figure 9:
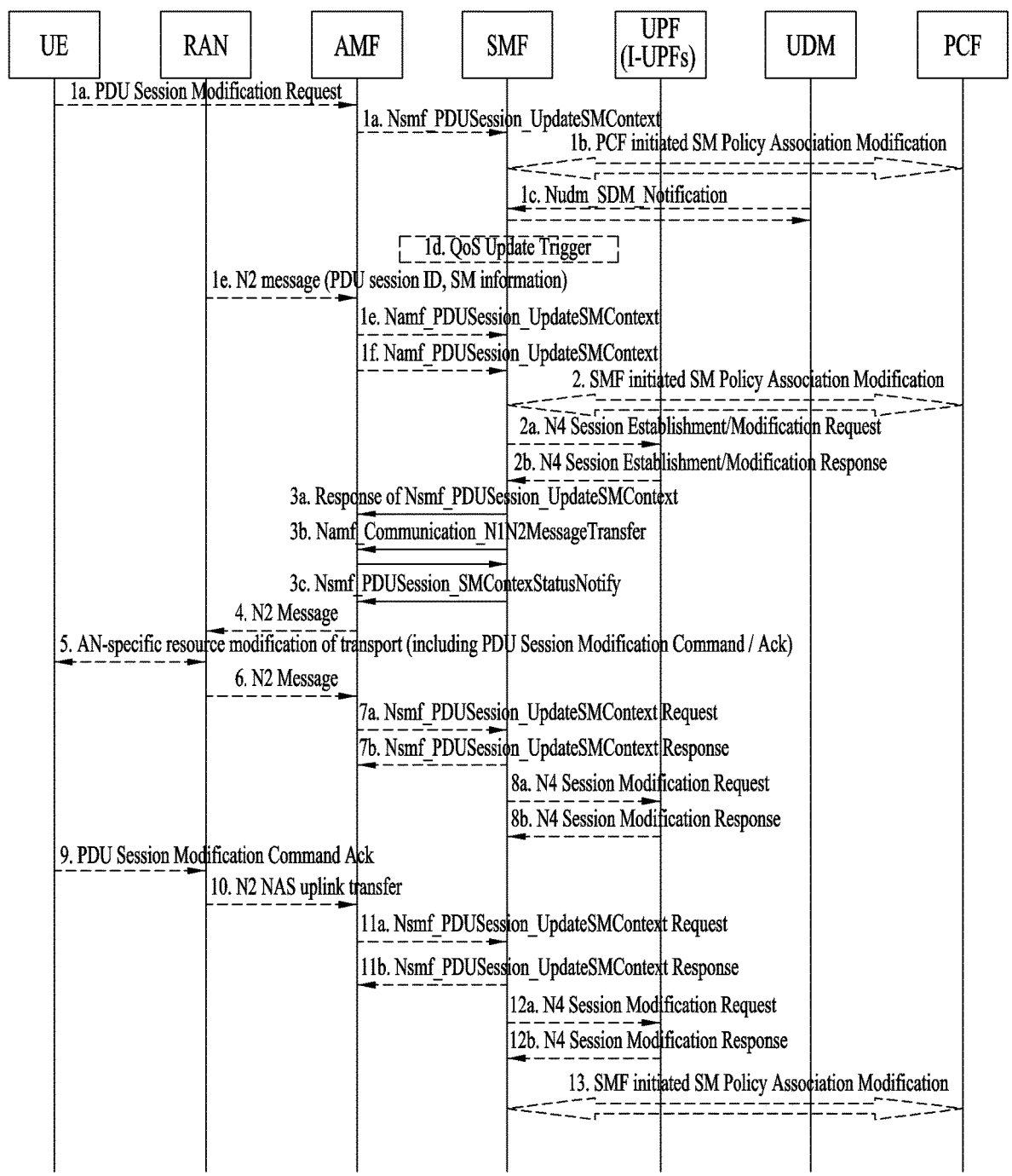
Figure 10:
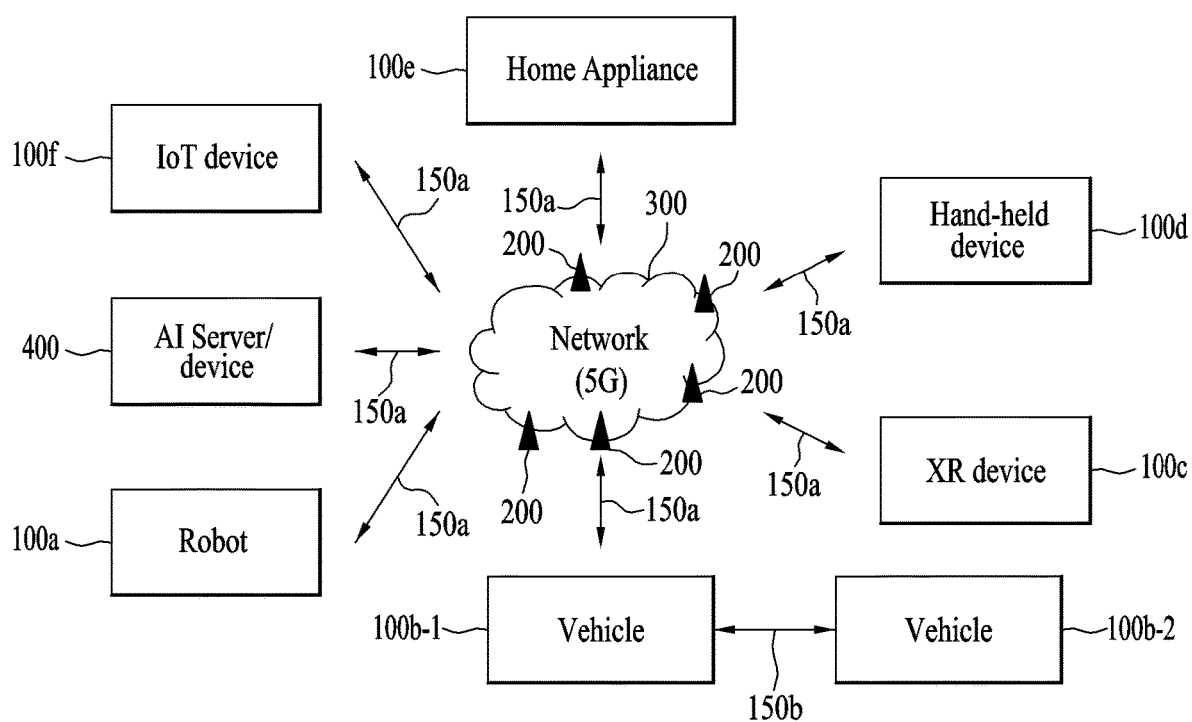
FIG. 10 illustrates a communication system 1 applied to the present disclosure.
Figure 11:
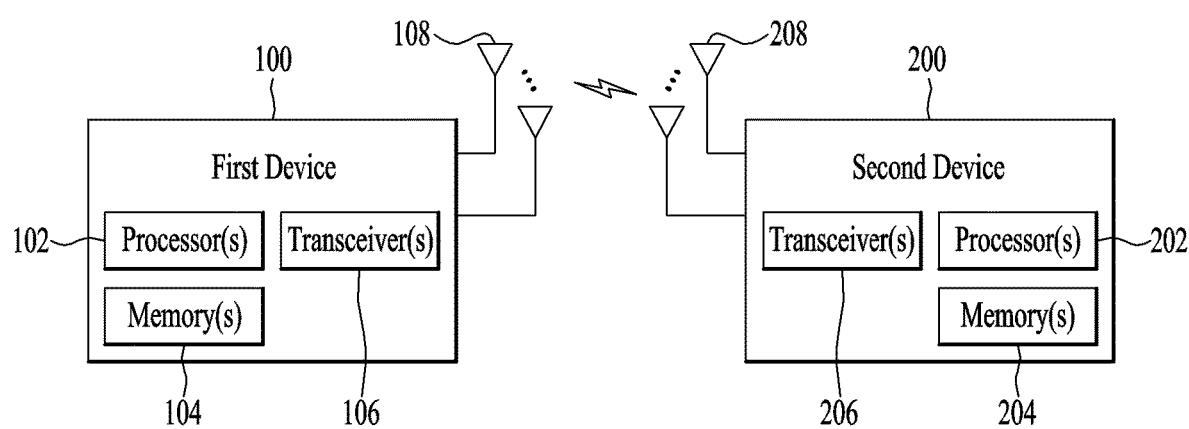
FIG. 11 illustrates a wireless device applicable to the present disclosure.
Figure 12:
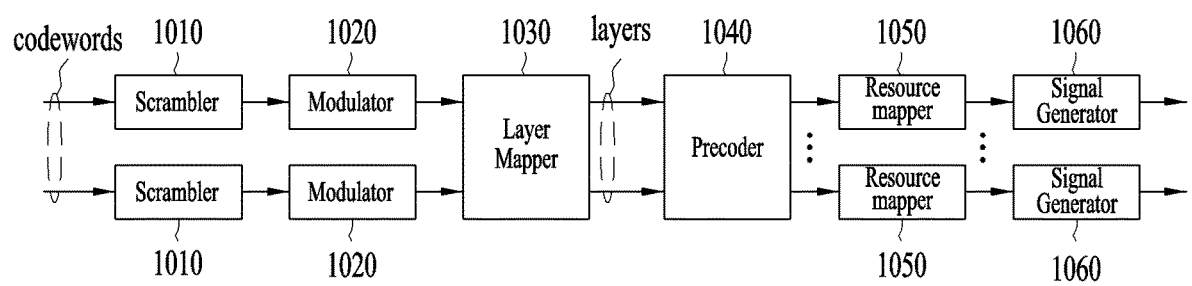
FIG. 12 illustrates a signal processing circuit for a Tx signal.

Alternatively, the PDU session related message may be a PDU session modification related message forwarded from the SMF. In this regard, FIG. 9 shows a PDU session modification procedure. Referring to FIG. 9, in step 3*a* or step 3*b*, an SMF may include an Alternative QoS Profile in N2 SM information forwarded to an NG-RAN. Namely, at least one or more Alternative QoS Profiles are included for a prescribed GBR QoS Flow together with a QoS Profile and then provided to the NG-RAN. An AMF forwards the N2 SM information received from the SMF to the NG-RAN in step 4. For reference, each QoS Flow is identified by a QoS Flow Identifier (QFI). Hence, the QoS Profile and the Alternative QoS Profile(s) are provided to the NG-RAN as a part of QoS Parameters for the QoS Flow identified by the QFI. Besides, details of the respective steps shown in FIG.

9 refer to the contents disclosed in 'UE or network requested PDU Session Modification' of Section TS 23.502 4.3.2.2, which is used as the related art of the specification.

For another example, an NG-RAN notifies a 5GCN of whether to guarantee (or fulfill) a QoS on an Alternative QoS Profile instead of a QoS on a QoS Profile on a QoS Flow. This may be construed as the NG-RAN applies QNC for the Alternative QoS Profile instead of applying QNC for the QoS Profile of the QoS Flow.

To this end, an SMF configures/copies the same content of a QoS Profile, which is provided to the NG-RAN in QoS Flow generation/addition, into one of Alternative QoS Profiles and then provides it to the NG-RAN. In case of providing a multitude of Alternative QoS Profiles to the NG-RAN, the Alternative QoS Profile to which the QNC is applied by the NG-RAN may include an Alternative QoS Profile corresponding to the first or an Alternative QoS Profile regarded as having a highest priority, or may be marked explicitly. Namely, the SMF provides an original QoS for the QoS Flow as one of the Alternative QoS Profiles as well as the QoS Profile, and the NG-RAN checks whether the QoS is guaranteed (or fulfilled) for the Alternative QoS Profile indicating the original QoS.

In addition, if the SMF receives information on a currently supportable Alternative QoS Profile together with a notification indicating that an original QoS cannot be guaranteed (or fulfilled) from the NG-RAN, the SMF may perform PDU Session Modification on the corresponding QoS Flow. In doing so, the SMF configures/copies the content of the currently supportable Alternative QoS Profile to a QoS Profile that will be provided to the NG-RAN. And, the SMF includes an Alternative QoS Profile indicating the original QoS among the Alternative QoS Profiles provided. Namely, in case of providing a multitude of Alternative QoS Profiles to the NG-RAN, the corresponding Alternative QoS Profile may include an Alternative QoS Profile corresponding to the first or an Alternative QoS Profile regarded as having a highest priority, or may be marked explicitly. Namely, the SMF provides an original QoS for the QoS Flow as one of the Alternative QoS Profiles, and the NG-RAN checks whether the QoS is guaranteed (or fulfilled) for the Alternative QoS Profile indicating the original QoS.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
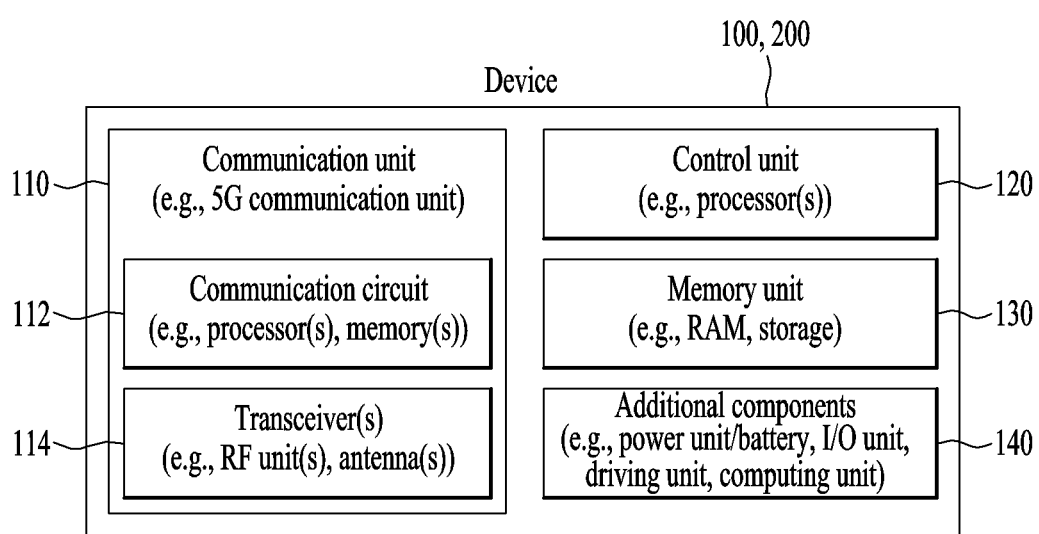
FIG. 13 illustrates another example of a wireless device applied to the present disclosure.

FIG. 13 illustrates a communication system 1 applied to the present disclosure.

Referring to FIG. 13, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 14:
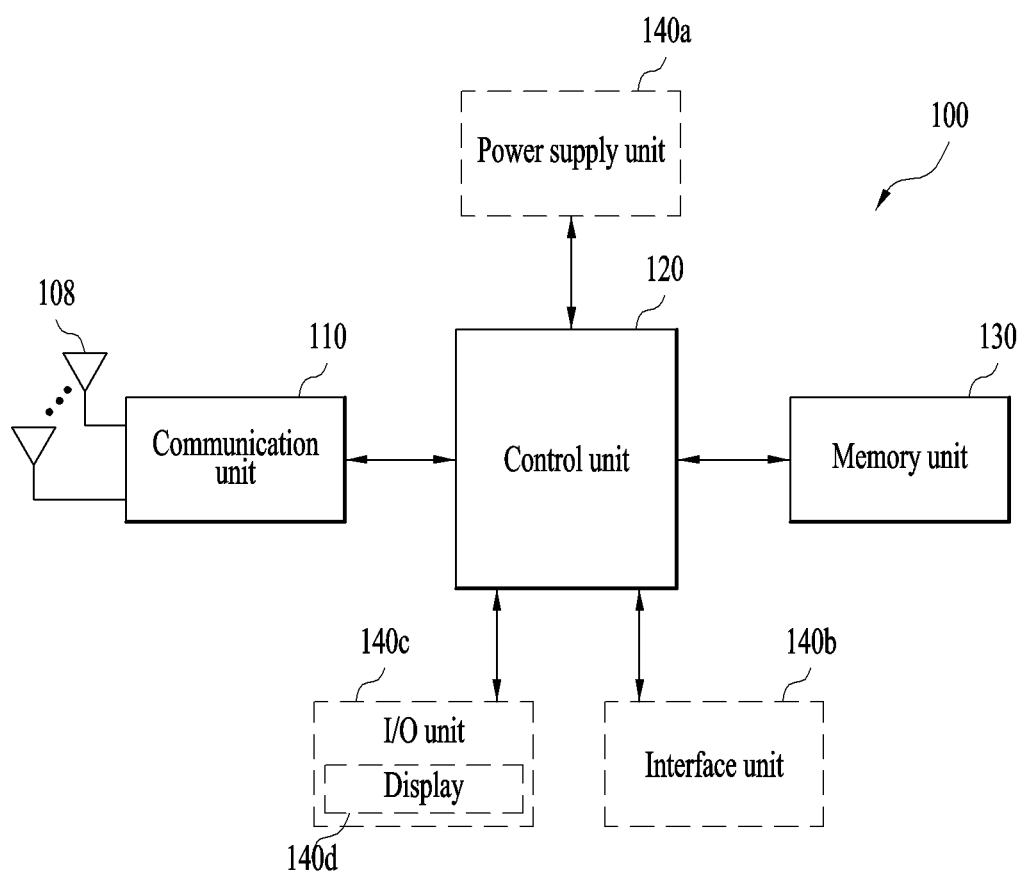
FIG. 14 illustrates a portable device applied to the present disclosure.

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Signal Process Circuit Applicable to the Present Disclosure

Figure 15:
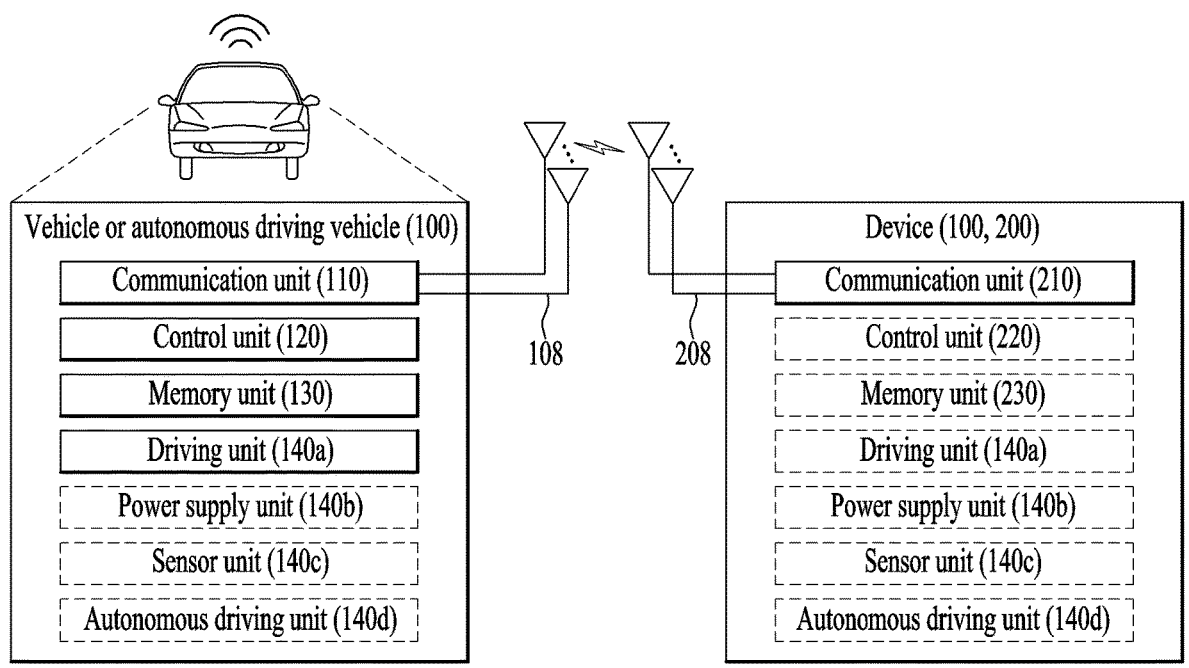
FIG. 15 illustrates a vehicle or an autonomous vehicle applied to the present disclosure.

FIG. 15 illustrates a signal process circuit for a transmission signal.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include IFFT modules, CP inserters, digital-to-analog converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency DL converters, analog-to-digital converters (ADCs), CP remover, and FFT modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Examples of Application of Wireless Device Applicable to the Present Disclosure

Figure 16:
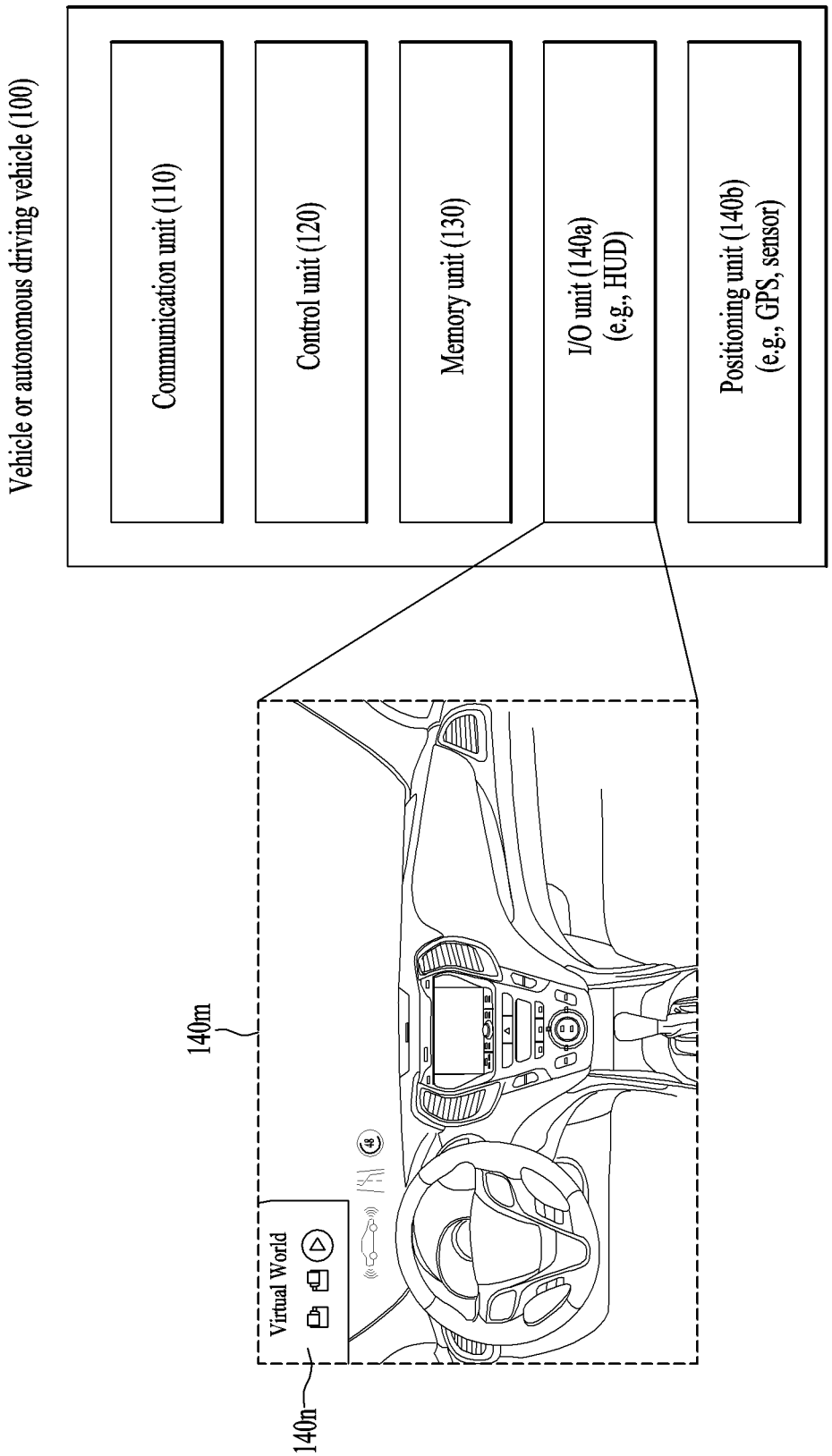
FIG. 16 illustrates a vehicle applied to the present disclosure.

FIG. 16 illustrates another example of a wireless device applied to the present disclosure. The wireless device may be implemented in various forms according to a use-case/service (refer to FIG. 13).

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a FinTech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Hereinafter, an example of implementing FIG. 16 will be described in detail with reference to the drawings.

Examples of a Hand-Held Device Applicable to the Present Disclosure

Figure 17:
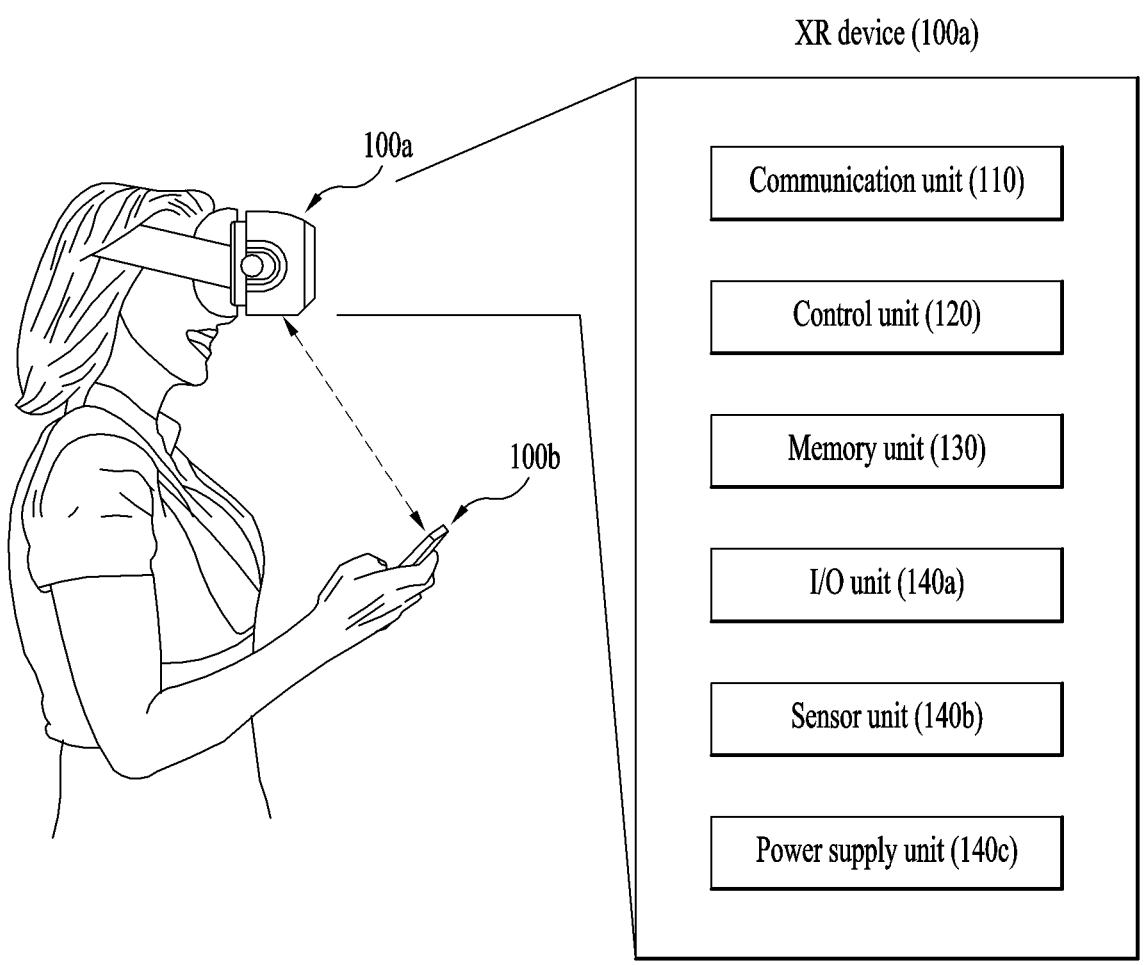
FIG. 17 illustrates an XR device applied to the present disclosure.

FIG. 17 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 18:
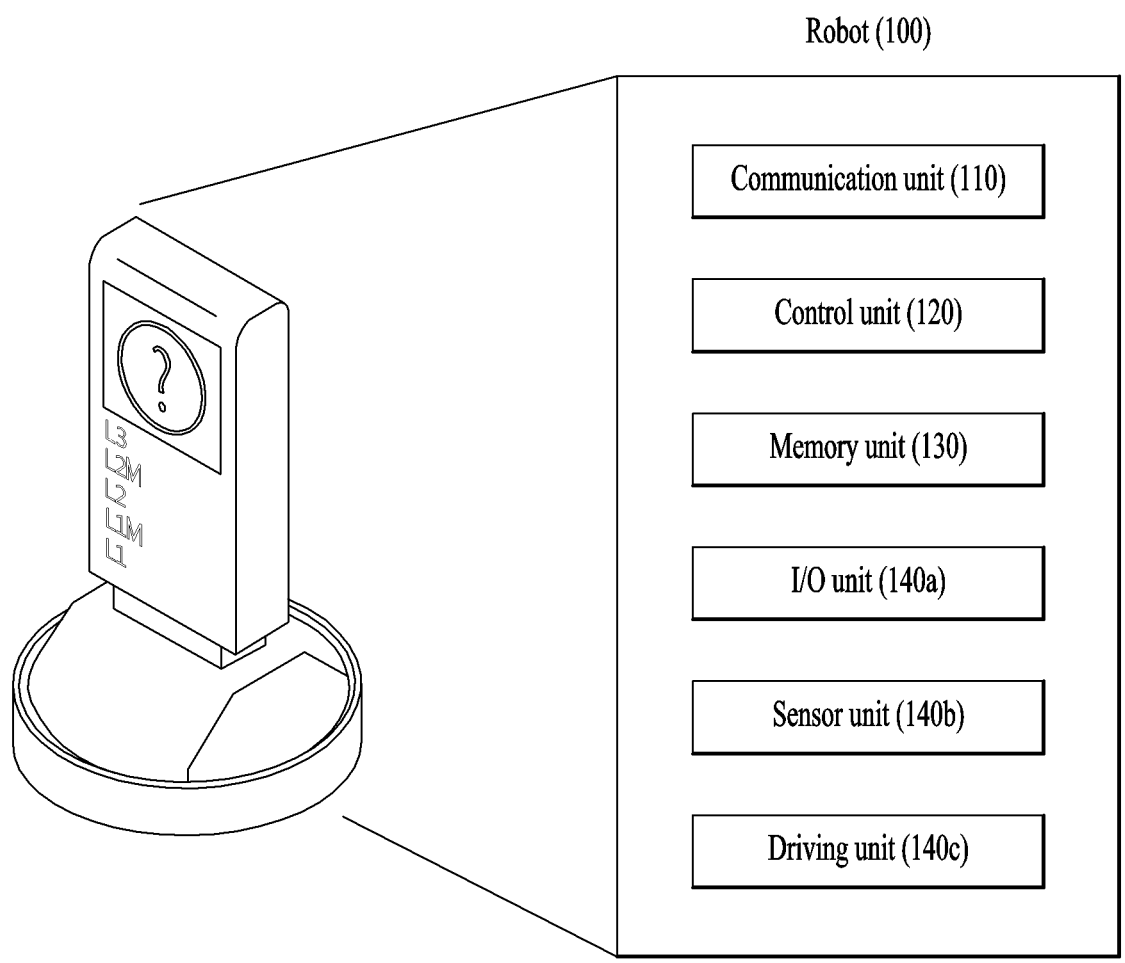
FIG. 18 illustrates a robot applied to the present disclosure.

Examples of a Vehicle or an Autonomous Driving Vehicle Applicable to the Present Disclosure FIG. 18 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 18, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is configured, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 19:
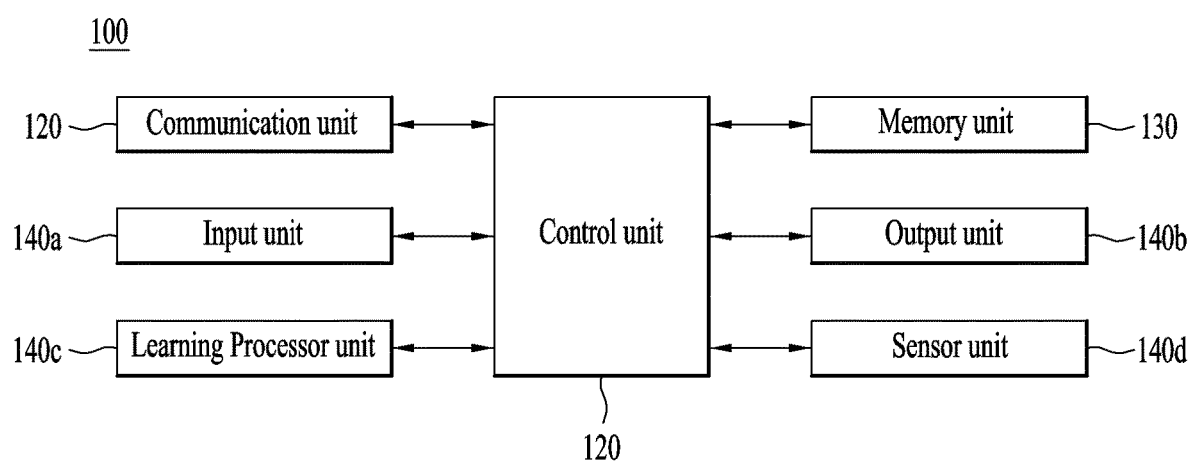
FIG. 19 illustrates an AI device applied to the present disclosure.

FIG. 19 illustrates a vehicle applied to the present disclosure. The vehicle may be implemented as a transport means, an aerial vehicle, a ship, etc.

Referring to FIG. 19, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 16.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

FIG. 20 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 20, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 16, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a Robot Applicable to the Present Disclosure

FIG. 21 illustrates a robot applied to the present disclosure. The robot may be categorized into an industrial robot, a medical robot, a household robot, a military robot, etc., according to a used purpose or field.

Referring to FIG. 21, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 16, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Examples of an AI Device Applicable to the Present Disclosure

FIG. 22 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 22, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 16, respectively.

The communication unit 110 may transmit and receive wired/radio signals (e.g., sensor information, user input, learning models, or control signals) to and from external devices such as other AI devices (e.g., 100*x*, 200, or 400 of FIG. 13) or an AI server (e.g., 400 of FIG. 13) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analytics algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 13). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 13). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

INDUSTRIAL APPLICABILITY

The above-described embodiments of the present disclosure are applicable to various mobile communication systems.

What is claimed is:

1. A method of operating a Next Generation-Radio Access Network (NG-RAN) in a wireless communication system, the method comprising:
receiving, by the NG-RAN, a protocol data unit (PDU) session related message including a quality of service (QOS) profile related to a QoS flow and two or more Alternative QoS Profiles for the QoS flow;
based on a determination that a guaranteed flow bit rate (GFBR) of the QoS profile cannot be fulfilled and a determination that a first Alternative QoS Profile can be fulfilled for the QoS flow among the two or more Alternative QoS Profiles, transmitting, to a session management function (SMF) by the NG-RAN, information regarding the first Alternative QoS Profile together with a first notification that the GFBR of the QoS profile is not can no longer be guaranteed for the QoS flow; and
based on the first notification having been transmitted to the SMF and a determination that a second Alternative QoS Profile different from the first Alternative QoS Profile indicated in the first notification can be fulfilled, transmitting, to the SMF by the NG-RAN, a second notification that the second Alternative QoS Profile is can be fulfilled for the QoS flow.

2. The method of claim 1, wherein the PDU session related message is a PDU session modification related message forwarded from the SMF.

3. The method of claim 1, wherein the PDU session related message is a PDU session establishment related message forwarded from the SMF.

4. The method of claim 1, wherein the two or more Alternative QoS Profiles differ from each other in a required QoS.

5. The method of claim 4, wherein a level of the required QoS of each of the two or more Alternative QoS Profiles is lower than that of the QoS profile.

6. An apparatus in a wireless communication system, the apparatus comprising:
at least one processor; and
at least one computer memory operatively connected to the at least one processor and storing instructions enabling the at least one processor to perform operations when executed, the operations comprising:
receiving a protocol data unit (PDU) session related message including a quality of service (QoS) profile related to a QoS flow and two or more Alternative QoS Profiles by a Next Generation-Radio Access Network (NG-RAN) for the QoS flow;
based on a determination that a guaranteed flow bit rate (GFBR) of the QoS profile cannot be fulfilled and a determination that a first Alternative QoS Profile can be fulfilled for the QoS flow among the two or more Alternative QoS Profiles, transmitting, to a session management function (SMF) by the NG-RAN, information regarding the first Alternative QoS Profile together with a first notification that the GFBR of the QoS profile can no longer be guaranteed for the QoS flow; and
based on the first notification having been transmitted to the SMF and a determination that a second Alternative QoS Profile different from the first Alternative QoS Profile indicated in the first notification can be fulfilled, transmitting, to the SMF by the NG-RAN, a second notification that the second Alternative QoS Profile is can be fulfilled for the QoS flow.

7. The apparatus of claim 6, wherein the PDU session related message is a PDU session modification related message forwarded from the SMF.

8. The apparatus of claim 6, wherein the PDU session related message is a PDU session establishment related message forwarded from the SMF.

9. The apparatus of claim 6, wherein the two or more Alternative QoS Profiles differ from each other in a required QoS.

10. The apparatus of claim 9, wherein a level of the required QoS of each of the two or more Alternative QoS Profiles is lower than that of the QoS profile.

11. The method of claim 1, wherein the second notification includes information regarding the second Alternative QoS Profile.

12. The apparatus of claim 6, wherein the second notification includes information regarding the second Alternative QoS Profile.

* * * * *